May 29, 1951 A. A. ZDANKOSKI 2,555,073
FISHING APPARATUS
Filed Oct. 4, 1948 3 Sheets-Sheet 3

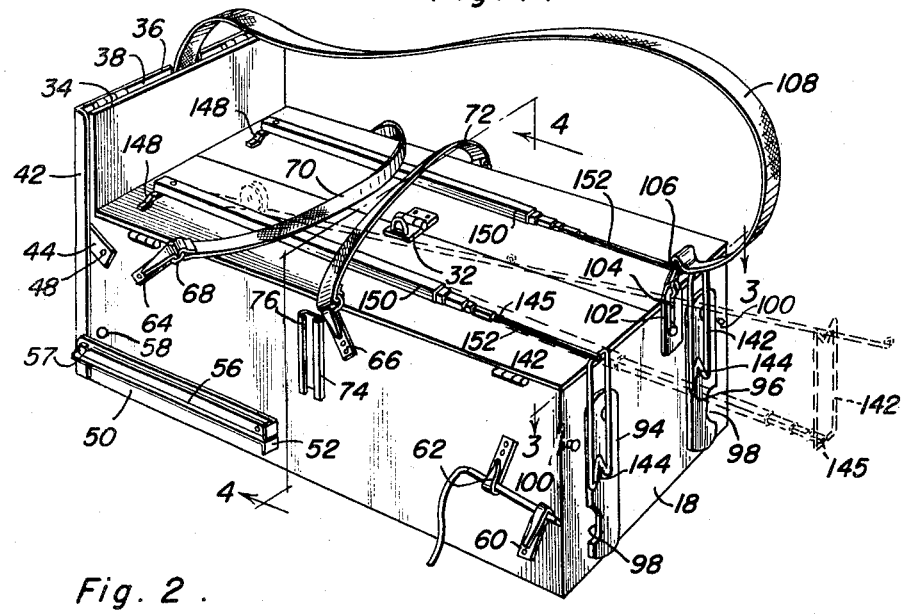
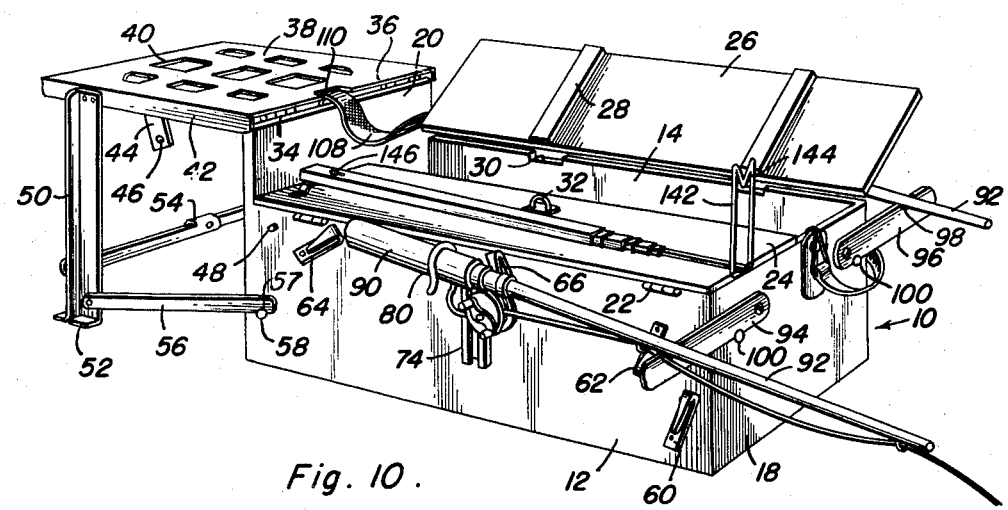
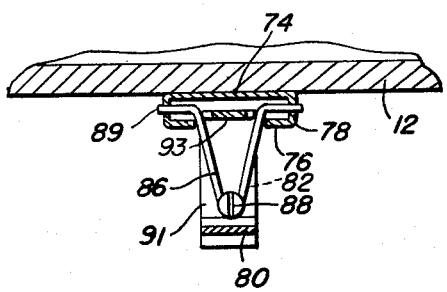

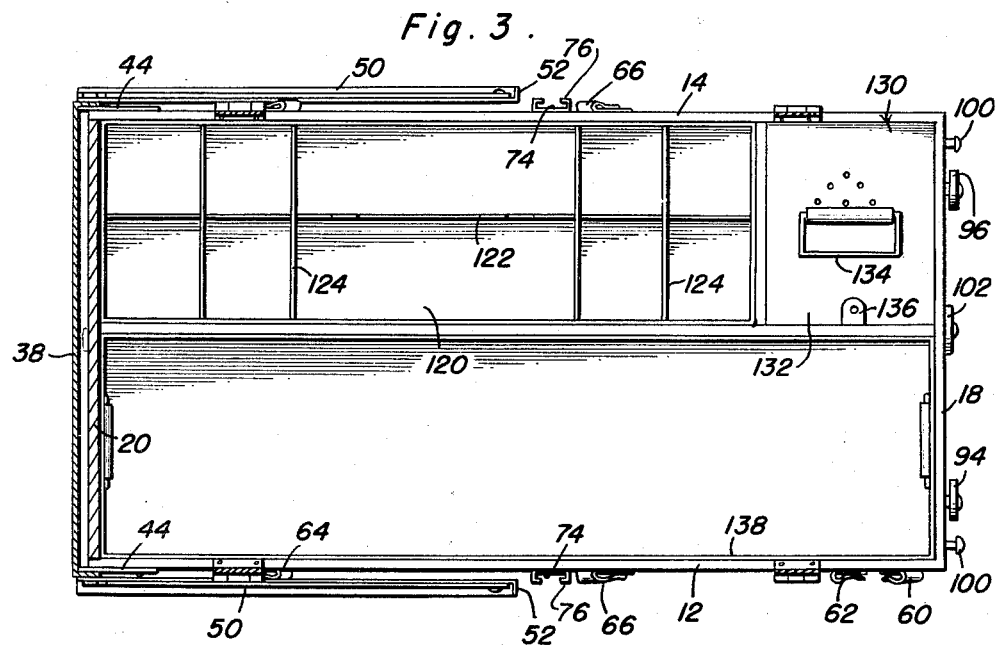
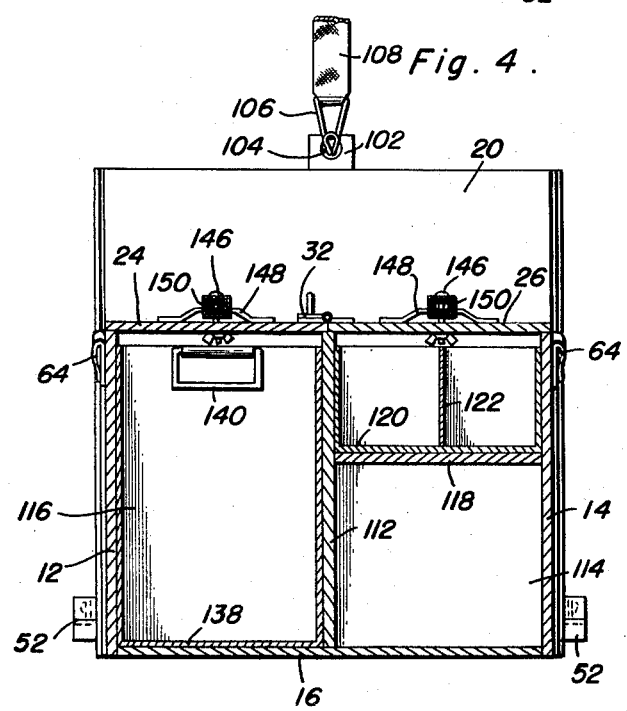
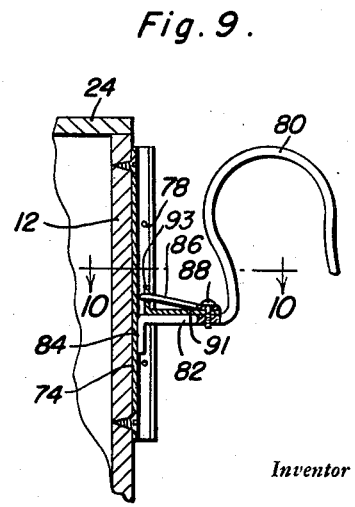

Inventor
Adolph A. Zdankoski
By Clarence A. O'Brien
and Harvey B. Jacobson
Attorneys Patented May 29, 1951

2,555,073

UNITED STATES PATENT OFFICE 2,555,073

FISHING APPARATUS

Adolph A. Zdankoski, Erie, Pa.

Application October 4, 1948, Serial No. 52,673

7 Claims. (Cl. 43—54.5)

This invention relates to new and useful improvements in fishing apparatus and the primary object of the present invention is to provide a combination fishing box, creel, pole holder, bait box and seat.

Another important object of the present invention is to provide a fishing chest or box including a hinged panel forming a seat so that a fisherman may be seated in a comfortable position relatively close to the equipment needed during fishing, and embodying novel and improved means for supporting and bracing the seat to the box.

A further object of the present invention is to provide a utility box for fishermen embodying a novel and improved holder whereby a fishing pole may be supported relatively to the box without the necessity of having the fisherman hold such a pole.

A still further aim of the present invention is to provide a fishing apparatus that is simple and practical in construction, strong and reliable in use, small and compact in structure, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view of the present invention assembled for transportation;

Figure 2 is a view similar to Figure 1, and showing the seat in position for use, a fishing pole supported relative to the box, and one hinged closure in an open position;

Figure 3 is a longitudinal horizontal sectional view of the present invention taken substantially on the plane of section line 3—3 of Figure 1 and below the closures for the cabinet;

Figure 4 is a transverse vertical sectional view taken substantially on the plane of section line 4—4 of Figure 1;

Figure 9 is an enlarged fragmentary vertical sectional view showing the manner in which the pole holder is applied to the present box;

Figure 10 is a horizontal sectional view taken substantially on the plane of section line 10—10 of Figure 9;

Figure 11:
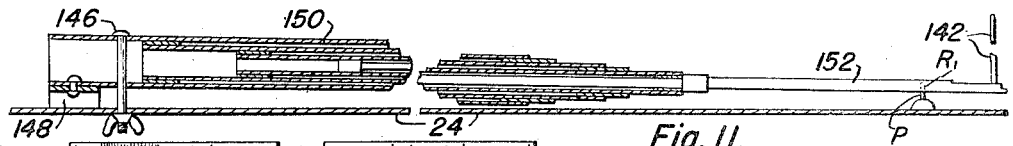
Figure 11 is an enlarged sectional view through the center of one of the telescoped holders.
Figure 5:
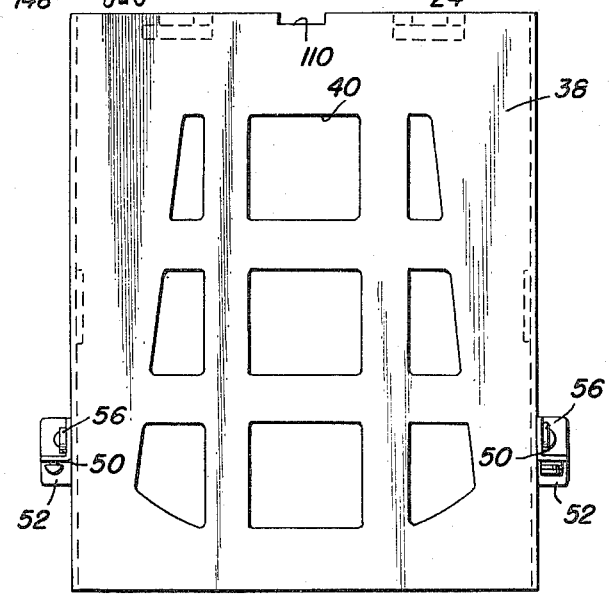
Figure 5 is an enlarged top plan view of the seat used in conjunction with the present invention.

Referring now to the drawings in detail, wherein for the purpose of illustration, there is disclosed a preferred embodiment of the present invention, the numeral 10 represents a substantially rectangular box or cabinet generally, including a pair of side walls 12 and 14, a bottom wall 16 and a pair of end walls 18 and 20.

Hinged as at 22 to the upper edges of the side walls 12 and 14, is a pair of complementary closures 24 and 26 that are reinforced by cross members or blocks 28. It being noted that the upper edges of the side walls 12 and 14 are notched as at 30 to receive the members 28 when the closures 24 and 26 are in a closed position.

A hasp or suitable latch 32 is mounted on the closures 24 and 26 and receives a suitable lock for normally retaining the closures 24 and 26 in a closed and locked position.

The end wall 20 extends well above the upper edges of the end wall 18 and the side walls 12 and 14, and the upper edge thereof is hinged as at 34 to one transverse edge 36 of a substantially rectangular seat or panel 38 having openings 40 therein. The longitudinal edges of the seat 38 are turned inwardly to provide side flanges 42 that support latch members 44 having openings 46 which receive lugs 48 fixed to and projecting from the side walls 12 and 14 to retain the seat in a lowered and unused position, as shown best in Figure 1 of the drawings.

Preferably angle iron leg members 50 are fixed at one of their terminals to the side flanges 42 and the leg portions of the leg members 50 are turned outwardly, at their free end portions, to provide bearing feet 52.

The leg members 50 are connected and braced to each other by a folding brace 54, and pivoted to the leg members 50 adjacent the free ends thereof, are the inner ends of brace arms 56 the free ends of which are notched, as at 57, to receive locking pins or lugs 58 carried by the side walls 12 and 14 in order to support the seat 38 relative to the box 10 and in a raised, substantially horizontal position.

Fixed to the side walls 12 and 14, adjacent the end wall 18, is a pair of elongated, spaced and oppositely arranged spring clips 60 and 62 that will support leaders, fish stringers hooks or the like in a conveniently accessible position.

Further spring clips 64 and 66 are secured to the side walls 12 and 14 and engage loops 68 at the ends of a pair of flexible hand carrying straps 70 and 72.

Channel members or base plates 74 are secured to the side walls 12 and 14 and include inturned flanges 76. The leg portions of the members 74 are provided with longitudinally spaced openings 78 for a purpose which will later be more fully apparent.

The numeral 80 represents a hook element or pole holder that is used in conjunction with each of the channel members 74, there being preferably two although any suitable number may be employed. The shank portions 82 of the hook elements 80 are angulated and terminate in bearing flanges 84 that bear against the web portions of the channel members 74 in order to support the hooks 80 against downward swinging movement.

Substantially V-shaped resilient locking members 86 are secured by fasteners 88 to the shank portions 82 and the end portions of the V-shaped locking members 86 are turned outwardly to form portions 89 for engaging selected openings 78 for retaining the hook members in a vertically adjusted position for supporting the handle 90 of a fishing pole 92. The leg portions of the members 86 are manually moved toward each other to permit the portions 89 to be placed in selected openings 78.

An angle plate 91 is mounted on the shank portion 82 of each hook, by the fasteners 88, and each includes an upstanding flange 93 received between the legs of the locking members 86 to reinforce and strengthen the shank portions 82.

Arms 94 and 96 are pivoted on the end wall 18 and the free ends of the arms 94 and 96 are notched as at 98 to conform to the shape of the pole or poles 92. Stops 100 are fixed to and project from the end wall 18 in order to support the arms 94 and 96 in a substantially horizontal position when the same are in use with the hook elements 80 (see Figure 2).

Slidably secured to the end walls 18 and 20, is a pair of anchor plates 102 having openings 104 that receive hooks 106 at the ends of a flexible shoulder strap 108, it being noted that the seat 38 is notched as at 110 to accommodate the strap 108 and the plate 102 on the end walls 20 as shown in Figure 4.

Extending longitudinally between the end walls 18 and 20, is a substantially vertical partition 112 that supports the free longitudinal edges of the closures 24 and 26 when the same are in a closed position, and this partition 112 divides the box 10 into a pair of compartments 114 and 116.

A horizontally disposed partition 118 is fixed between the partition 112 and the side wall 14, at one end of the box 10, and supports the bottom wall of a substantially rectangular tray or tackle box 120 having a longitudinal partition 122 and transverse partitions 124. The longitudinal partition 122 is formed with an extension 126 having finger receiving openings 128.

Figure 6:
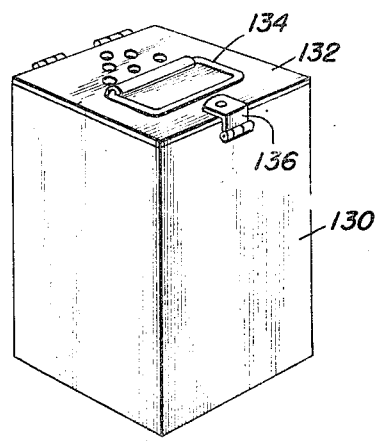
Figure 6 is a perspective view of the bait box used in conjunction with the present invention.
Figure 7:
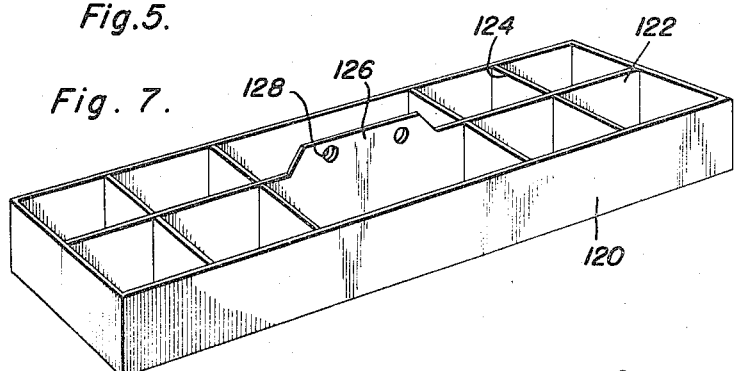
Figure 7 is a perspective view of the tackle box used in conjunction with the present invention.
Figure 12:
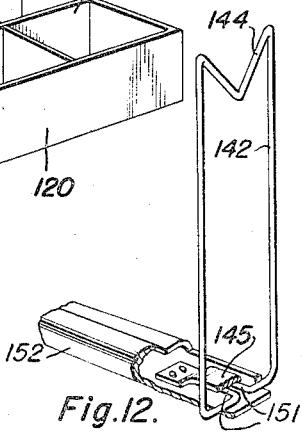
Figure 12 is a perspective view of the outer end of one of the holders.
Figure 8:
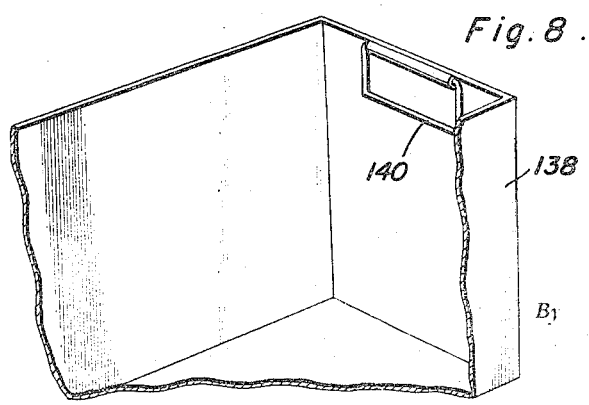
Figure 8 is a fragmentary perspective view of the creel used in conjunction with the present invention.

The numeral 130 represents a bait box or receptacle that is positioned in the compartment 114 adjacent the tray 120 and which is provided with a hinged, perforated closure 132 having a pivotal hand grip or bale 134. A locking latch 136, hinged to the box 130, normally retains the closure 132 in a closed position, as illustrated in Figure 6.

A substantially rectangular creel or receptacle 138 having an open upper end is disposed in the compartment 116 and includes pivotal hand grips 140 at each end whereby the same may be quickly removed from or placed in the compartment 116.

Secured by wing nuts and bolts 146 to brackets 148 carried by the closures 24 and 26, is a pair of casting rod holders 150 each of which includes a plurality of telescoped sections, the smaller of the sections 152 being retained to the closures 24 and 26 by suitable pins P carried by the closures and received in recesses R formed in the sections 152. The bolts 146 also extend through the closures as shown in Figure 4 of the drawings.

Pivotally secured to the outer end of the holders 150, are substantially V-shaped wire frame support members 142 having depressed webs which form saddles 144 for supporting casting poles or the like, and suitable springs 145 carried by the free outer ends of the holders 150 bear against the angulated end portions 151 of the members 142 to yieldingly retain the end portions 151 against the sections 152 and the holders 150 in a substantially vertical position, see Figure 1.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A fishing apparatus comprising a cabinet having a hinged closure, a seat hinged to said cabinet, means bracing said seat to said cabinet, means carried by said cabinet for supporting fishing poles, a carrying strap mounted on said cabinet, and means for supporting a casting rod relative to said cabinet, said seat including a substantially rectangular panel, legs carried by said panel, and means bracing said legs, said means bracing said legs including a folding brace.

2. A fishing apparatus comprising a cabinet having a hinged closure, a seat hinged to said cabinet, means bracing said seat to said cabinet, means carried by said cabinet for supporting fishing poles, a carrying strap mounted on said cabinet, and means for supporting a casting rod relative to said cabinet, said means bracing said seat to said cabinet including a pivotal arm having a free end portion, and a locking pin carried by said cabinet, the free end portion of said arm being notched to receive said pin.

3. A fishing apparatus comprising a cabinet having a hinged closure, a seat hinged to said cabinet, means bracing said seat to said cabinet, means carried by said cabinet for supporting fishing poles, a carrying strap mounted on said cabinet, and means for supporting a casting rod relative to said cabinet, said means for supporting fishing poles including a rest pivoted on said cabinet, means supporting said rest in a substantially horizontal position and a pole holder carried by said cabinet and cooperating with said rest.

4. The combination of claim 3 wherein said pole holder includes a hook element, a base plate supporting said hook element, and means adjustably securing said hook element to said base plate.

5. The combination of claim 4 wherein said last mentioned means includes a spring latch.

6. The combination of claim 3 wherein said pole holder includes a hook member, a channel member fixed to said cabinet and slidably receiving said hook member, the leg portions of said channel member having a group of openings, and a substantially U-shaped locking member having outturned end portions for engaging said openings.

7. A fishing apparatus comprising a cabinet having a hinged closure, a seat hinged to said cabinet, means bracing said seat to said cabinet, means carried by said cabinet for supporting fishing poles, a carrying strap mounted on said cabinet, and means for supporting a casting rod relative to said cabinet, said cabinet including a longitudinal partition dividing said cabinet into a pair of compartments, a tray mounted in one of said compartments, and a container mounted in one of said compartments adjacent said tray.

ADOLPH A. ZDANKOSKI.

REFERENCES CITED

The following references are of record in the file of this patent:

UNITED STATES PATENTS

| Number | Name | Date |
|---|---|---|
| 2,264,744 | Dunnam | Dec. 2, 1941 |
| 2,357,214 | McDole | Aug. 29, 1944 |
| 2,463,042 | Mathias | Mar. 1, 1949 |